Aug. 27, 1946.  G. W. CORNELIUS  2,406,588
AIRPLANE
Filed May 6, 1944  6 Sheets-Sheet 1
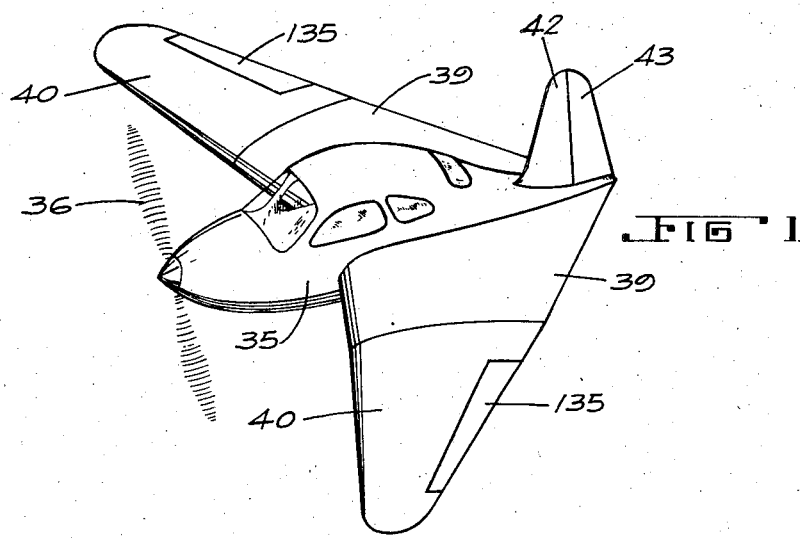//
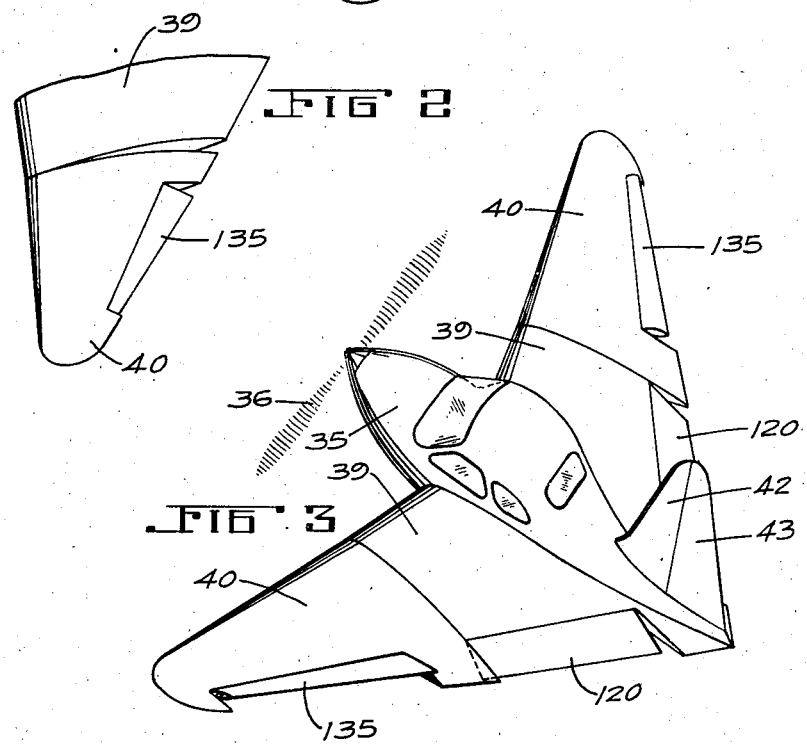
INVENTOR
GEORGE W. CORNELIUS
BY *Wallace and Cannon*
ATTORNEYS

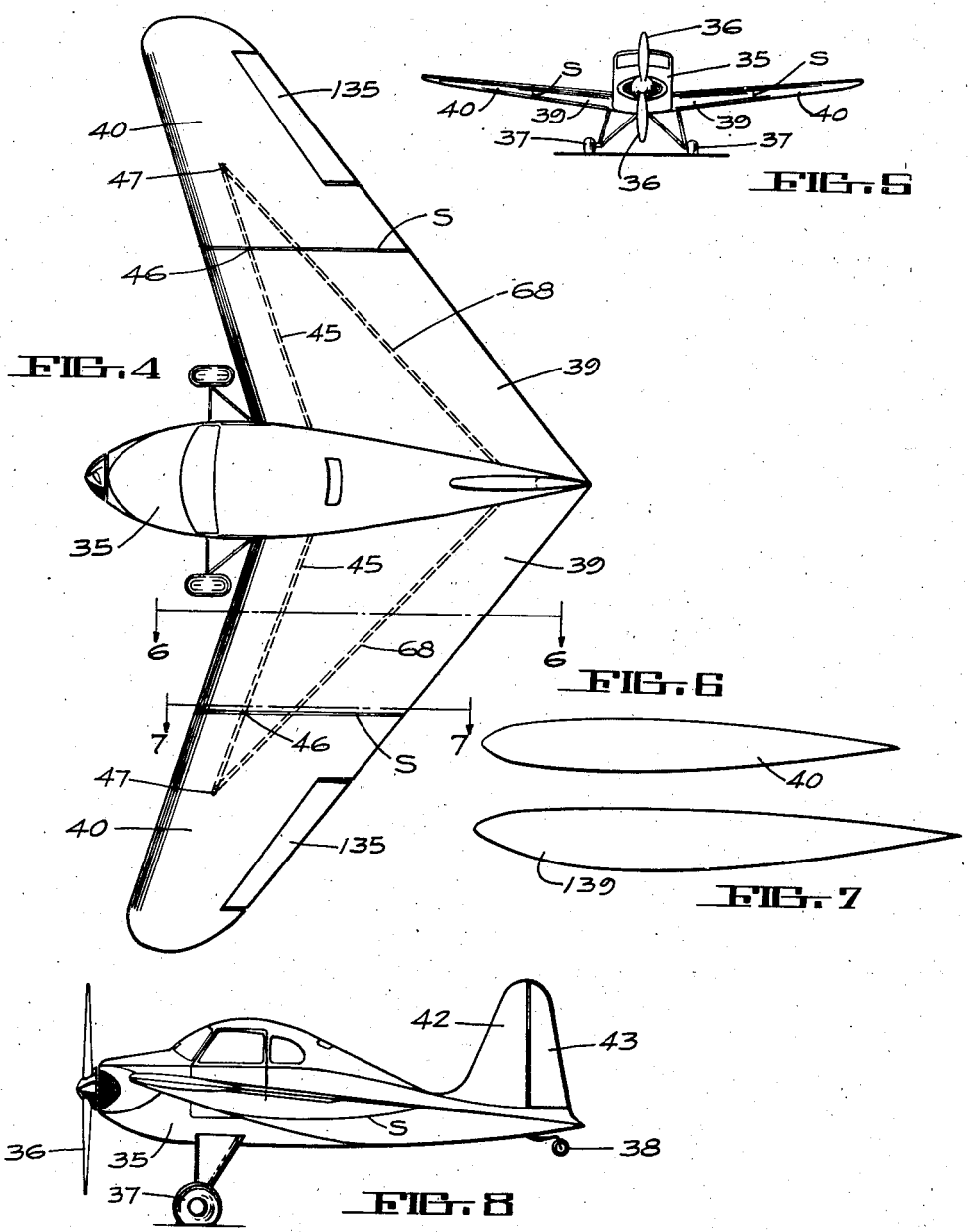

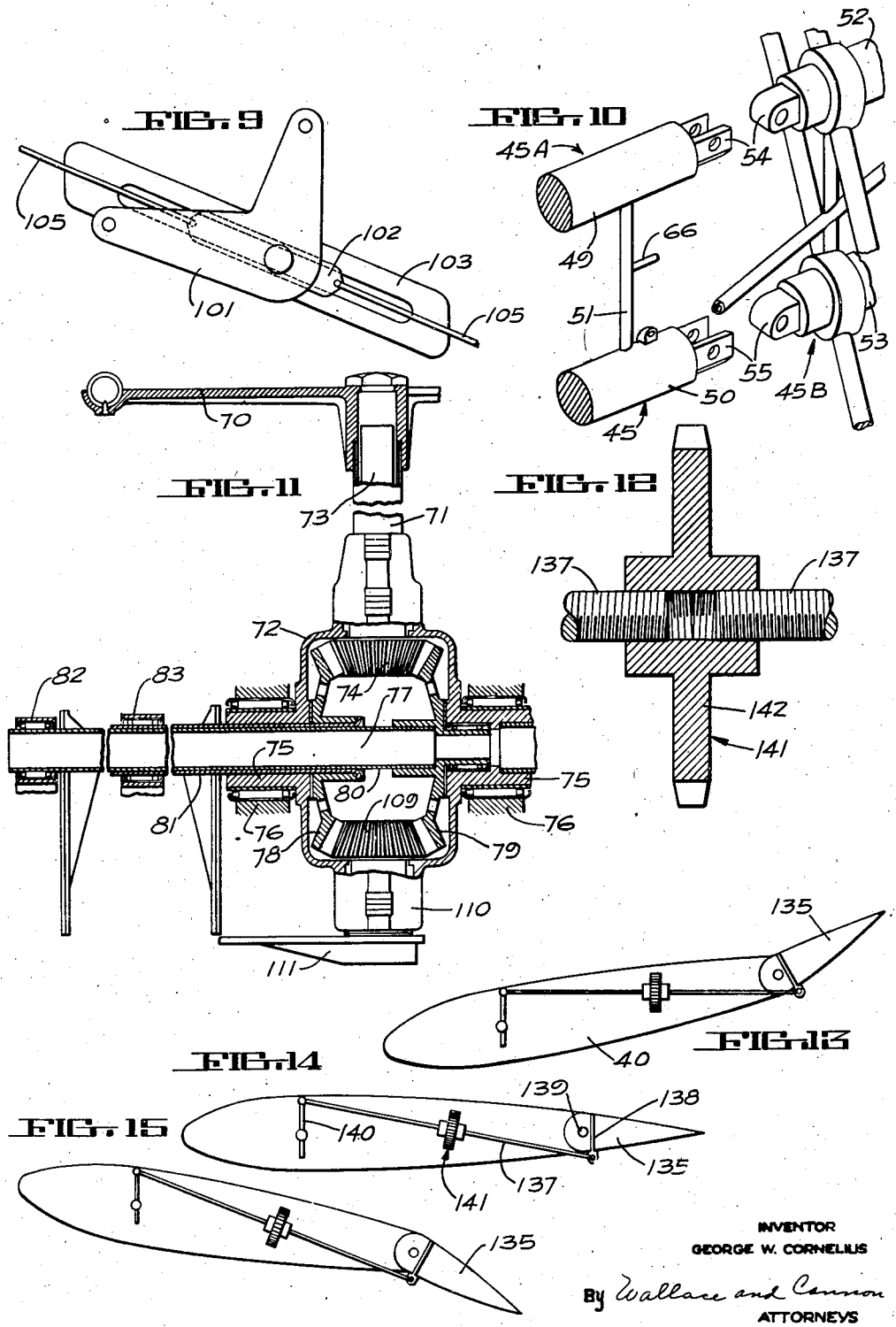

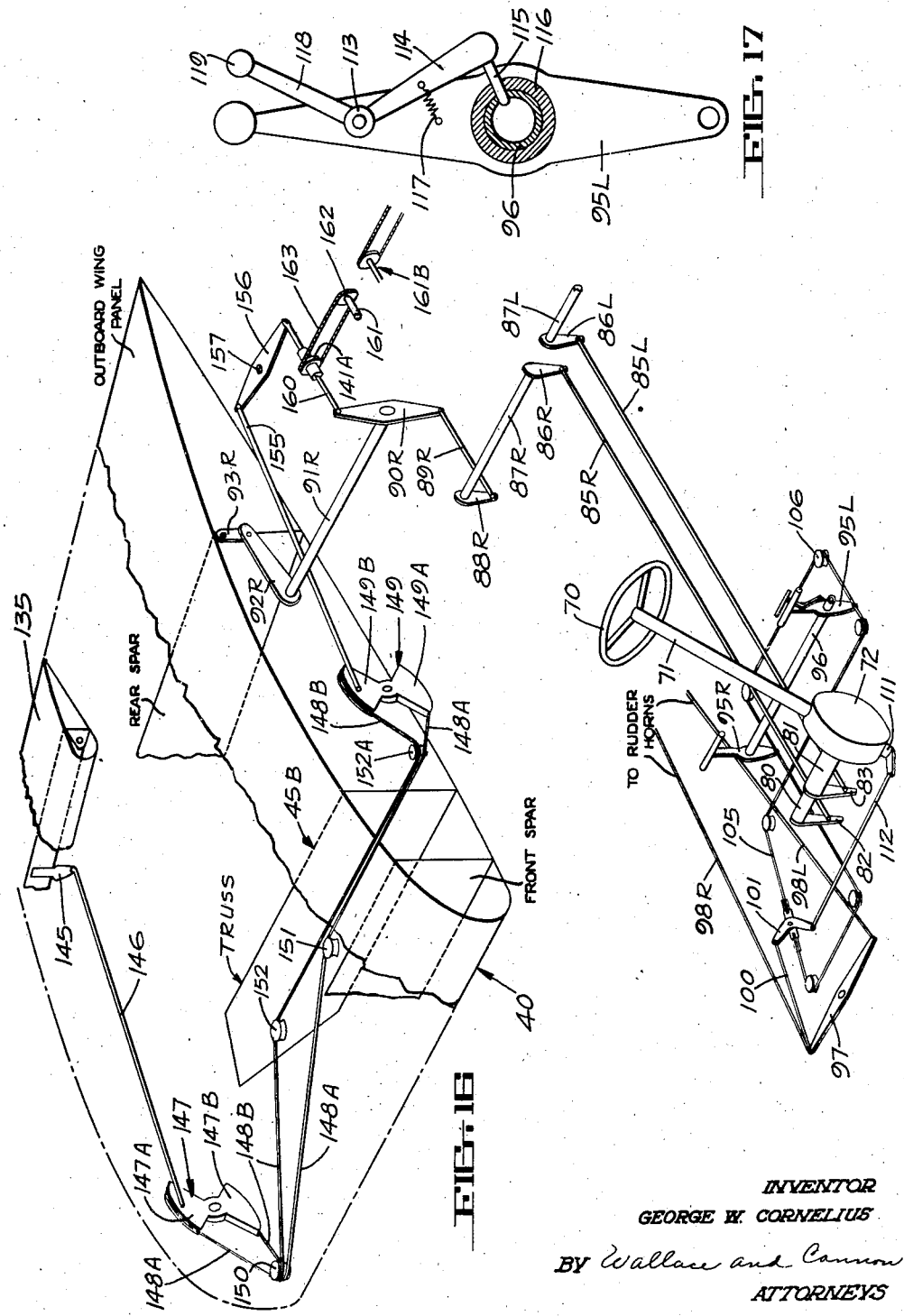

Aug. 27, 1946.  G. W. CORNELIUS  2,406,588
AIRPLANE
Filed May 6, 1944    6 Sheets-Sheet 5
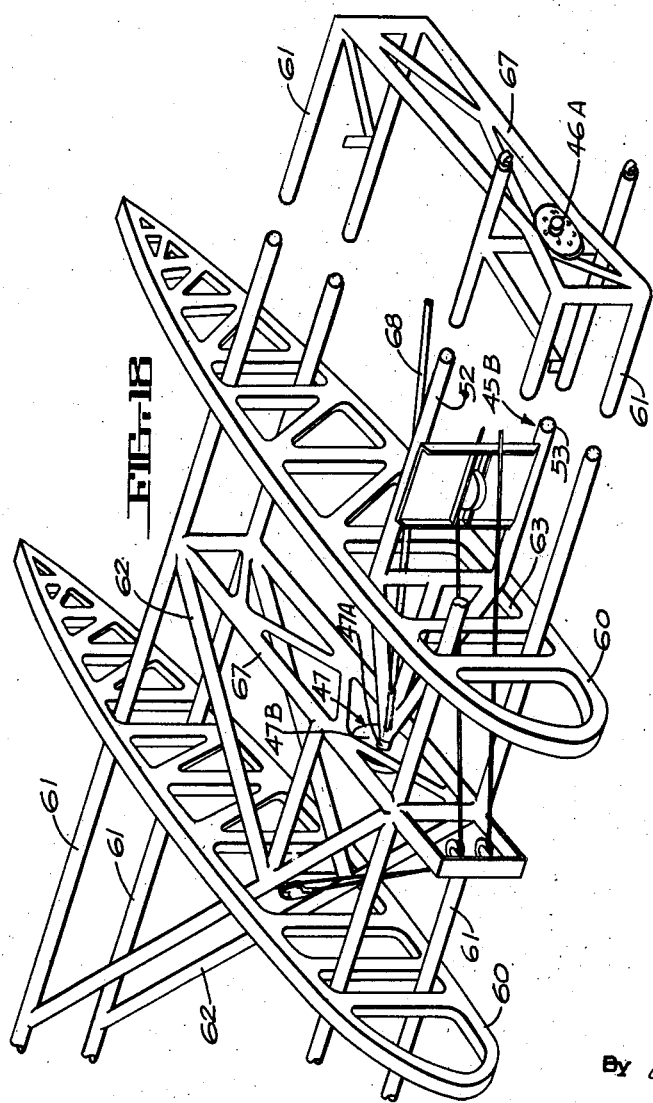
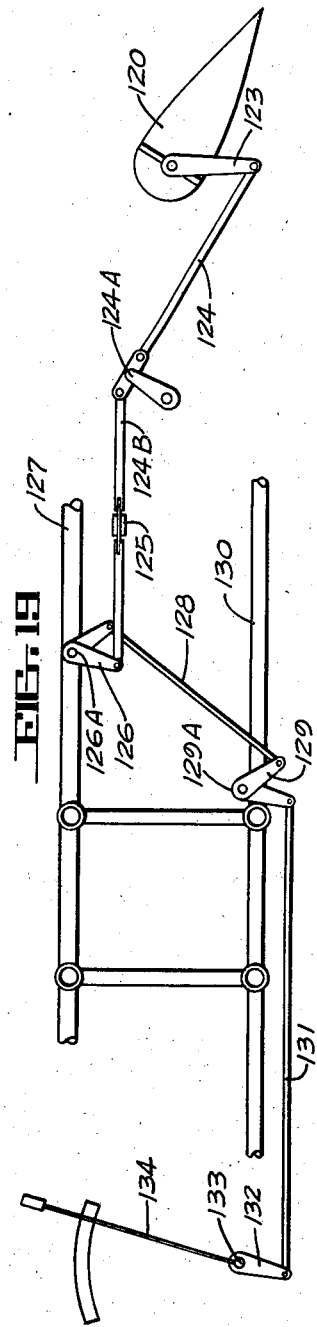
INVENTOR
GEORGE W. CORNELIUS
By Wallace and Cannon
ATTORNEYS

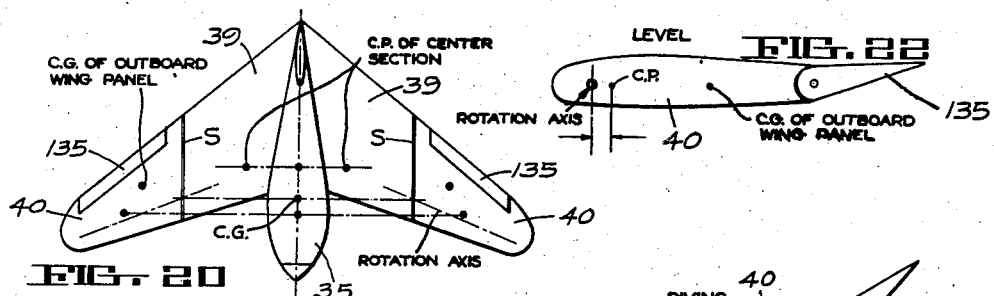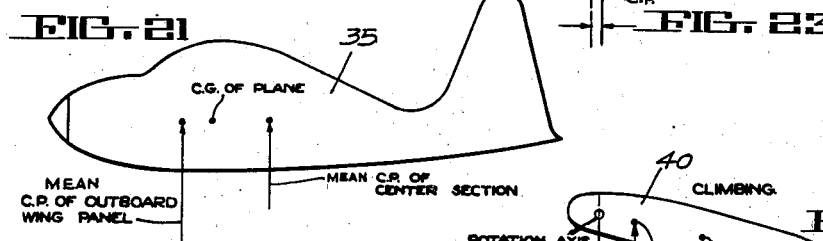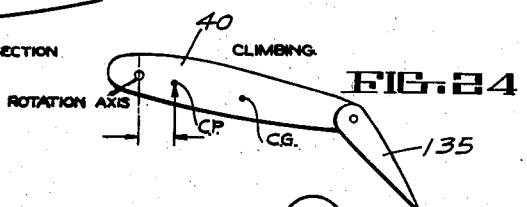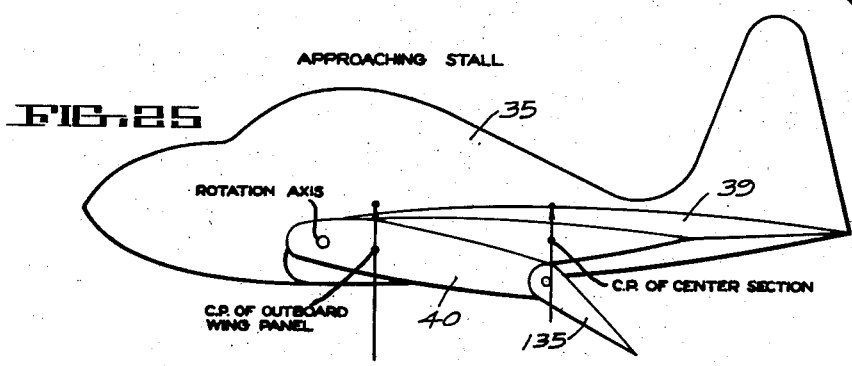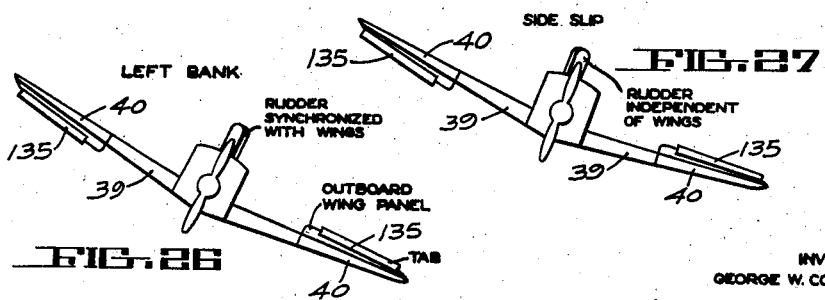

Patented Aug. 27, 1946

2,406,588

UNITED STATES PATENT OFFICE 2,406,588

AIRPLANE

George W. Cornelius, Dayton, Ohio, assignor to Flight Transportation, Inc., a corporation of New York Application May 6, 1944, Serial No. 534,437

10 Claims. (Cl. 214—13)

1

This invention relates to airplanes and particularly to airplanes of the single wing or flying wing type, or in other words, to the class of airplanes in which the functions of the usual tail structure or empennage are accomplished by structure incorporated within the outlines of the main supporting airfoils.

The primary object of the present invention is to enable greater stability to be attained in an airplane of the flying wing type, and a further object is to increase the effectiveness of the control means in an airplane of this character, to thereby simplify the operation and control thereof.

A further object is to enable such stability and control to be attained in such a manner as to insure highly efficient operation of the lifting surfaces of the airplane at all times. An object related to the foregoing is to enable stalling moment in an airplane to be induced and maintained by lifting forces applied forwardly of the center of gravity of the airplane, or in other words, to enable stalling moment to be attained without the necessity for applying negative counterbalancing forces such as are usually required to overcome the pitching tendency, which has heretofore been a necessary incident to the attainment of high lift conditions in an airplane. A further object related to the foregoing is to enable the conventional elevator surfaces in an airplane to be eliminated.

A further object of the invention is to enable an airplane to be controlled laterally and longitudinally by variation of the angle of incidence of substantial portions of the main wing panel; to enable this to be done by varying the angle of incidence of the outer end panel sections of the wings; to afford variable incidence wing panels which accomplish the functions usually attained by the ailerons and the elevators; and to so balance the forces acting on such variable incidence wing panels in normal flight that manual control or actuation of such wing panels may be readily and easily effected.

It is recognized that during flight of an airplane, the changes in air conditions encountered by an airplane tend to cause deviation of the airplane from its intended flight course, and such deviation is caused by the action of varying air currents which cause the airplane to be displaced about its pitching, yawing, or rolling axes. In some instances, the action of such air currents may even cause bodily displacement of the airplane without material change of the attitude of the airplane in respect to the aforesaid axes, and

2 such bodily displacement is also recognized as being objectionable. It is, therefore, a further object of the present invention to enable undesired displacement of the airplane by changing air conditions to be minimized, and further objects are to prevent undue bodily displacement of an airplane by changing air conditions and to enable longitudinal and lateral stability to be automatically attained. A further and more specific object is to enable variable incidence wing panels in a flying wing airplane to function automatically in flight to maintain longitudinal and lateral stability of an airplane and to prevent undue bodily displacement when changing air conditions are encountered.

In the operation of an airplane, it is customary for the pilot to control the movement of the airplane about its rolling axis by means such as ailerons, and when this is done, it is desirable to actuate the rudder in a coordinated manner so as to prevent side slip or skid of the airplane, and it is a further object of the present invention to enable the control means for the rudder to be so coordinated with the means which govern movement of the airplane about its rolling axis that automatic operation of the rudder is attained and side slip or skid of the airplane are prevented.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a perspective view of an airplane embodying the features of the invention;

Fig. 2 is a fragmental perspective view illustrating the movement of the outer wing panels;

Fig. 3 is a perspective view of the airplane, this view being arranged to include an illustration of trim tabs for trimming the airplane;

Fig. 4 is a plan view of the airplane shown in Fig. 1;

Fig. 5 is a front elevational view of the airplane;

Figs. 6 and 7 are diagrammatic views taken respectively along the lines 6—6 and 7—7 of Fig. 4 and illustrating the airfoil sections which may be employed in the outer and inner wing panels of the airplane of this invention;

Fig. 8 is a side elevational view of the airplane shown in Fig. 1;

Fig. 9 is a fragmental plan view showing a part of the rudder control mechanism;

Fig. 10 is a fragmental perspective view illustrating the manner in which the supporting truss for the outer wing panels is secured in position;

Fig. 11 is a fragmental sectional view of the control mechanism of the airplane;

Fig. 12 is a fragmental sectional view of a part of the control mechanism;

Figs. 13, 14 and 15 are views illustrating diagrammatically the relationship and action of a portion of the control mechanism of the airplane;

Fig. 16 is a diagrammatic perspective view illustrating the control mechanism for the airplane;

Fig. 17 is a fragmental sectional view illustrating a portion of the rudder control mechanism;

Fig. 18 is a fragmental perspective view showing the manner in which the outboard wing panels are supported;

Fig. 19 is a fragmental view illustrating the manner in which the trim tabs of the airplane are adjusted;

Fig. 20 is a diagrammatic plan view illustrating the relationship of the various elements of the airplane;

Fig. 21 is a diagrammatic side view illustrating the relationship of the aerodynamic elements of the airplane to the center of gravity thereof;

Figs. 22, 23 and 24 are diagrammatic views illustrating the relationship and movements of the elements of the outboard wing panels;

Fig. 25 is a diagrammatic illustration of the airplane in side elevation;

Fig. 26 is a diagrammatic front view of the airplane in a properly executed left bank; and Fig. 27 is a diagrammatic front view of the airplane in a side slip.

In the form of the invention chosen for disclosure herein, the invention is embodied in a single motored airplane of the tailless monoplane type, having a forwardly projecting fuselage 35 disposed midway between the ends of a wing structure. The single motor (not shown) is mounted within the fuselage 35 and is arranged to drive a propeller 36 disposed at the nose of the fuselage. Landing gear, including a pair of forward wheels 37 and a tail wheel 38 are provided on the fuselage 35, and it will be recognized that such landing gear may be of any desired kind. The wing structure of the airplane is preferably such as to provide a forward sweep throughout at least a portion of its extent, or in other words, the outer ends of the wings are disposed forwardly of the root portions thereof. Thus, the wing structure of the airplane, as herein shown, embodies inboard or trailing wing panels 39 which extend rigidly in outward directions from opposite sides of the fuselage 35, and outboard wing panels 40 are arranged so as to extend outwardly and in this instance forwardly from the inboard wing panels 39. Thus, the fuselage 35 and the two inboard wing panels 39 constitute a central structure, and the outer or leading wing panels 40 cooperate with the wing panels 39 to define a continuous wing structure of the monoplane type, wherein the front and rear profiles of the wing section are substantially continuous from tip to tip of the wing structure. Because of the forward sweep of the wing structure, directional control means may be associated with the central structure of the airplane rearwardly of the center of gravity of the airplane, and in the present instance a vertical fin and rudder structure is associated with and mounted on the rear portion of the fuselage 35. Thus as shown in Figs. 1 and 3 of the drawings, a vertical fin 42 is extended upwardly from the fuselage adjacent the rear end thereof, and a rudder 43 is mounted on the vertical fin 42 along the rear edge thereof.

In accordance with the present invention, the control of the airplane about its rolling axis and its pitching axis is attained through adjusting movement or manipulation of the outboard wing panels 40, and to enable this to be done, such wing panels 40 are supported for limited pivotal movement about generally horizontal axes. In affording such pivotal support for the outboard wing panels 40, a pair of supporting trusses 45 are extended outwardly in a rigid relationship from opposite sides of the fuselage, the arrangement being such that the trusses 45 extend through the respective inner wing panels 39 and into the interior of the adjacent outer wing panel 40. Within each of the outer wing panels 40, pivotal bearings 46 and 47 are provided for the wing panel 40 on the supporting truss 45, and such pivotal bearings are spaced longitudinally of the truss so as to afford an accurate supporting and guiding means for the outer wing panel. In the present instance, the supporting trusses 45 are so mounted and arranged that the pivotal axes afforded by the bearings 46 and 47 are in each instance disposed substantially parallel to and slightly ahead of the line defined by the center of pressure on the outer wing panels 40, for by this arrangement the control movement or actuation of the outer wing panels 40 may be more easily attained, and automatic operation of these wing panels may be attained as will hereinafter be pointed out in detail. Thus the outer wing panels 40 may be rocked with relation to the inner or central structure and such rocking movement enables the angle of incidence of such outer wing panels to be varied or changed during flight.

In attaining such support or mounting of the outer wing panels 40, each truss 45 is in the present instance made in two sections, one section 45A of which is permanently mounted within the related wing panel 39, while the other section 45B is mounted within the wing panel 40. Thus, as shown in Fig. 10, the truss section 45A is made from an upper tubular member 49 and a lower tubular member 50, such tubular members being interconnected at various points throughout their length by truss elements such as the vertical rod 51 shown in Fig. 10. Similarly, the truss section 45B includes an upper tubular member 52 and a lower tubular member 53 which are interconnected by suitable truss elements. The upper members 49 and 52 of the two truss sections are adapted to be interconnected by fittings 54, while the lower truss elements 50 and 53 are adapted to be interconnected by fittings 55, shown in Fig. 10 of the drawings.

The outer wing panel 40 is arranged to include a plurality of truss-like ribs 60 which are interconnected by spanwise spars 61 and angular braces 62, and the truss-like ribs 60 are arranged with relatively large openings 63 therein so that the supporting truss section 45B may extend through such ribs in a manner which enables the ribs 60 and the wing section to rock with relation to the truss section 45B. The pivotal mounting or bearing 46 for supporting the wing panel 40 on the truss 45 at the inner end edge of the wing panel 40 is afforded by a bearing pin 66 extended in an outward direction, as shown in Fig. 10, from the truss element 51, and this bearing pin 66 is engaged by the bearing sleeve 46A which is carried on or within the wing section 40. Such bearing element 46A is in the present instance mounted upon a supporting truss which extends from front to rear within the wing panel 40 between the front and rear spars 61. The outer bearing 47 for the wing panel 40 is afforded by a bearing pin 47A, provided at the end of the truss 45B as shown in Fig. 18. An outer bearing element 47B is arranged to embrace the bearing pin 47A and the bearing element 47B is carried as a part of the wing section 40 by a truss 67 extended between the front and rear spars 61 of the wing section. Thus the bearings 46 and 47 afford the desired rotatable or rocking mounting for the outer wing panels 40. In the present instance, it will be observed that the truss 45 embodies considerable strength or rigidity in a vertical direction, but is not particularly strong in a front to rear direction, and when this arrangement is employed in the truss 45, a bracing means such as a brace rod 68, Figs. 4 and 18, is provided so as to extend from a point adjacent the outer end of the truss section 45B. The brace rod 68 extends in an inward and rearward direction through the openings in the ribs 60, and the inner end of the brace rod 68 is anchored in the rigid structure of the wing panel 39. The relationship of the brace rod 68 to the openings in the ribs 60 is such that rocking movement of the outer wing panel 40 may take place throughout the desired range without contact with the brace rod 68. The rearwardly extending brace rod 68 serves to transmit the drag forces applied by the wing panel 40 to the rigid portions of the adjacent wing panel 39, and hence the truss section 45B is maintained in a predetermined relation to the central structure of the airplane.

The rocking movement of the outer wing panels 40 of the airplane of this invention is utilized to attain those functions which would ordinarily be attained by the elevators and the ailerons of a conventional airplane, and the means for manually attaining such control movements of the outer wing panels 40 are disposed in the cabin or fuselage of the airplane and are so arranged that they may be operated or actuated in substantially the same manner as the control means of conventional airplanes. Thus as shown in Fig. 16 of the drawings, a control wheel 70 is mounted on the upper end of a tubular post 71 that extends in an upward and generally rearward direction from a gear housing 72. The wheel 70 is connected to the upper end of a shaft 73 that extends downwardly through the tubular post 71 and into the gear housing 72, and a bevel gear 74 is mounted on the shaft 73 within the housing 72. The housing 72 has bearing sleeves 75 extended from opposite sides thereof at right angles to the axis of the shaft 73, such bearing sleeves being omitted in Fig. 16 of the drawings but being shown in Fig. 11. The bearing sleeves 75 are rotatably mounted in supporting bearings 76 so that the wheel and its supporting tube 71 may be rocked from front to rear about the axis of the bearings 76 to attain controlling actions which will hereinafter be described. A shaft 77 is extended through the housing 72 and is supported in an indirect manner in the bearing sleeves 75, and within the housing 72, a pair of bevel gears 78 and 79 are mounted in a rotatable relation about the shaft 77 and in a meshed relationship with opposite sides of the bevel gear 74. Thus when the wheel 70 is rotated in a particular direction, the two bevel gears 78 and 79 will be rotated in opposite directions, while these two bevel gears 78 and 79 will remain in the same relationship to each other and may be rocked or rotated in the same direction by rocking movement of the wheel 70 and the supporting tube 71 in a front to rear direction.

Such movements of the bevel gears 78 and 79 are utilized in imparting the desired rocking movements to the outer wing panels 40. In attaining this result, a tubular shaft 80 is fixed to the bevel gear 79 and extends about the shaft 77 to a point outside of the housing 72. Similarly, a tubular shaft 81 is fixed to the bevel gear 78 in a surrounding relation to the tubular shaft 80 and extends outwardly of the housing 72. The shafts 80 and 81 have arms 82 and 83 connected respectively thereto and extended downwardly therefrom, and the arm 82 is operatively connected to the right-hand wing panel 40 to impart rocking movements thereto, while the arm 83 is operatively connected to the left-hand wing panel to impart rocking movements to this wing panel. Such connections in the present instance include a link 85R extended from the arm 82 to the lower end of an arm 86R fixed on a rock shaft 87R. The arm 88R, fixed on the opposite end of the shaft 87R, is connected by a link 89R to the lower end of a cross arm 90R which is fixed to an outwardly extending rock shaft 91R. The rock shaft 91R is disposed within the right-hand inner wing panel 39, and at its outer end the rock shaft 91R has a rearwardly extending arm 92R. The end of the arm 92R is connected by a link 93R to a rigid portion of the outer wing panel 40, as for instance, by connection to the rear spar elements of this outer wing panel.

Similar connections, including a link 85L, an arm 86L, and a shaft 87L are provided between the arm 83 and the left-hand outer wing panel 40, so that by rocking movement of the arms 82 and 83, the desired rocking movements may be imparted to the outer wing panels. Thus in the event that both outer wing panels 40 are to be rocked in an upward or forward direction so as to induce pitching or downward gliding movement of the airplane, such rocking movements of the two outer wing panels 40 may be caused by rocking the wheel and the supporting tube 71 in a forward direction. When this is done, the two bevel gears 78 and 79 are rocked in unison so that the lower edges thereof are moved in a rearward direction. This causes corresponding rocking movement of the arms 82 and 83 in unison and in a rearward direction. Such movement of the two arms 82 and 83 will, of course, be transmitted through the connections to the two wing panels 40, and the manner in which such motion is transmitted will be evident from a consideration of Fig. 16 of the drawings. Thus the link 85R will move rearwardly so as to rock the shaft 87R and move the arm 88R and the lower end of the cross bar 90R in a rearward direction. This results in rocking movement of the shaft 91R so as to cause the rear end of the arm 92R to be elevated. This causes the rear edge portion of the right wing panel 40 to be elevated, thereby causing rocking movement of this wing panel 40 about its supporting bearings 46 and 47; and it will be understood that similar rocking movement will in this instance be applied to the left-hand wing panel 40. In a similar manner, it will be clear that rearward rocking movement of the wheel 70 will cause downward rocking movement of the arms 92R and downward rocking movement of the outer wing panels 40 will therefore be attained.

In the event that the pilot wishes to turn either to the right or to the left, the outer wing panels 40 are differentially actuated so as to cause one side of the airplane to be raised and the other side of the airplane somewhat lowered, thereby to throw the airplane into a banking attitude. This maneuver is, of course, accompanied in most instances by a suitable coordinated adjustment of the rudder, as will hereinafter be explained. Thus, if the pilot wishes to turn to the right, the wheel 70 is rotated about its axis in a right-hand direction. When this is done, the bevel gear 79 is rotated so that its lower edge moves in a rearward direction and produces corresponding rearward movement of the arm 82. The bevel gear 78 and the arm 83 are, of course, moved in this instance in the opposite sense, and the arm 83 moves in a forward direction. Thus, the rearward movement of the arm 82 causes the arm 92B to be moved upwardly thereby to tilt the right-hand panel 40 in such a way as to reduce its angle of incidence. Similarly, the forward movement of the arm 83 causes the left-hand wing panel 40 to be so tilted as to increase its angle of incidence, and as a result of this, the left-hand side of the airplane is elevated while the right-hand side of the airplane is somewhat lowered. In this attitude, the plane turns to the right. The wing panels 40 may of course be actuated in the opposite sense to produce a left-hand banking attitude of the airplane, and when the wheel 70 is rotated in the manner just described to produce a banking attitude of the airplane, the amount of rocking movement of the two wing panels 40 in opposite directions is substantially equal. It will be recognized, however, that in the course of a rotative movement of the wheel 70 in either direction, the wheel may also be moved in a front to rear direction so as to rock the supporting tube 71 and the housing 72. When this is done, the gearing within the housing 72 partakes of a relatively complex movement in which the rocking movement of the supporting tube 71 may offset the rotative movement of one of the gears 78 or 79 which is induced by rotation of the wheel 70. In such an instance, one of the wing panels 40 may remain stationary while rocking movement is imparted in one direction or the other to the other wing panel 40.

The rudder 43 may be actuated in substantially the same manner as in conventional airplanes and, as shown in Fig. 16 of the drawings, this means includes a right-hand rudder pedal 95R and a left-hand rudder pedal 95L, these rudder pedals being mounted for rocking movement on a stationary shaft 96 for rocking movement relative to such shaft. The lower ends of the two rudder pedals are operatively connected to the rudder 43 by means including a centrally pivoted lever 97, the lever 97 having its opposite ends connected by cables 98L and 98R to the oppositely extending arms or rudder horns (not shown) which are provided on the rudder 43. The desired movements are imparted to the rudder 43 by rocking movement of the centrally pivoted lever 97. This connection, in the present instance, includes a rigid rod 100 fixed to the right-hand end of the lever 97 and extended rearwardly therefrom. The rear end of the rod 100 is connected to one arm of a bell crank 101, which is shown in Figs. 9 and 16, this bell crank being centrally pivoted on a slide member 102 which is guided for reciprocating movement in a guideway 103. When the bell crank 101 is held against rocking movement, the slide member 102 may be actuated in a longitudinal direction and such movement of the slide member 102 will be transmitted through the bell crank and the link 100 to impart corresponding rocking movement to the lever 97. Such sliding movement of the slide member 102 may be attained through selective actuation of the rudder pedals 95R and 95L, and for this purpose, a rudder cable 105 is extended about a plurality of guide pulleys 106 so that opposite ends of the cable 105 are connected to opposite ends of the slide 102 and intermediate portions of the cable 105 are connected to the lower ends of the two rudder pedals 95R and 95L. When the rudder pedal 95R is actuated, the cable 105 is actuated so as to produce forward movement of the slide member 102, and when this is done, the right-hand end of the lever 97 is moved forwardly so as to actuate the rudder cable 98R in a forward direction. This produces a right-hand movement of the rudder 43. Similarly, when the rudder pedal 95L is actuated, the slide member 102 is moved in a rearward direction so as to move the left-hand end of the lever 97 in a forward direction, and this movement is transmitted through the rudder cable 98L so as to produce a left-hand movement of the rudder 43.

In accordance with the present invention, the rudder 43 is normally actuated in a coordinated relationship to the differential actuation of the outboard wing panels 40 so that the airplane may be turned to the right or to the left under ordinary conditions without operation of the rudder pedals 95R or 95L. In accomplishing this function, the gearing mechanism within the housing 72 is utilized. Thus as shown in Fig. 11 of the drawings, a bevel gear 109 is mounted in the housing 72 so as to be coaxial with the bevel gear 74, and the gear 109 is meshed with the two gears 78 and 79. The bevel gear 109 is supported in a bearing sleeve 110 which extends downwardly from the housing 72, and a shaft connected to the gear 109 extends from the sleeve 110 and has an upwardly and forwardly projecting arm 111 fixed thereon. The arm 111 is connected by a link 112 to the other arm of the bell crank 101 so that upon rotation of the bevel gear 109, the bell crank 101 is rocked in one direction or the other in accordance with the direction of rotation of the bevel gear 109. Thus the rocking movement of the arm 111 will serve to rock the bell crank 101, and if the slide 102 is held stationary in its guideway 103, such rocking movement of the bell crank 101 will serve to operate the rudder 43. In order that the slide 102 may be held stationary under normal conditions, means is provided for locking the rudder cable 105 against movement. This means is best shown in Figs. 16 and 17 wherein a bell crank 113 is illustrated as being mounted on the rudder pedal 95L. The downwardly extending arm 114 of the bell crank 113 has a locking pin 115 fixed thereon so that it may slide radially through the mounting sleeve 116 of the pedal 95 and into a locking opening in the non-rotatable mounting shaft 96 upon which the pedal 95L is supported. A spring 117 acting between the arm 114 and the pedal 95L urges the locking pin 115 toward its active position so that the rudder pedal 95L and the associated rudder cable 105 are normally locked against movement. The other arm 118 of the bell crank 113 extends upwardly and has a cross bar 119 at its upper end. This cross bar is spaced from the upper end of the pedal 95L so that when an operator endeavors to actuate the pedal 95L, the bar 119 is first shifted in a forward direction so as to retract the locking pin 115.

When the locking pin 115 is in its active position, the rudder cable 105 acts to hold the slide 102 against movement and hence the rotative movements of the wheel 70 to produce differential movements of the outboard panels 40, serve also to impart coordinated adjustment to the rudder 43. As an example, a right-hand rotation of the wheel 70 which results in decreasing the angle of incidence of the right-hand wing panel 40 and increasing the angle of incidence of the left-hand wing panel 40, serves also to produce a rocking movement of the arm 111 in a left-hand direction. This serves to operate the bell crank 101 in such a way as to move the link 100 in a forward direction, thereby pulling the rudder cable 98R forwardly and causing adjustment of the rudder in a right-hand direction. Such adjusting of the rudder is, of course, proportional to the adjusting movements imparted to the outboard wing panels 40, the actuation thereof being attained from the same adjusting movement of the wheel 70. The rudder pedals may, of course, be actuated at any time so as to dominate the automatic rudder operating means, and in such a case the movement of the slide 102 will attain the desired rudder operation regardless of the position of the bell crank 101.

It will be observed that the airplane of the present invention is controlled without the use of conventional elevators, but despite this fact, trailing edge wing flaps 120 may be provided on the inner wing panels 39 for use as a means for trimming the airplane to conform with variations in load distribution. The trim flaps 120 are shown only in Figs. 3 and 19 of the drawings. Thus as shown in Fig. 19, each trim flap 120 has a downwardly extending actuating arm 123 and links 124, 124A, and 124B are extended in a connected relation from the arm 123 to an arm 126 of a bell crank 126A. The link 125B includes a turn buckle connection 125. The bell crank 126A is mounted on an upper spar or longeron 127 of the fuselage, and the other arm of the bell crank 126A is connected by a link 128 to an arm 129 of a bell crank 129A. The bell crank 129A is mounted on a lower spar or longeron 130 of the fuselage. The other arm of the bell crank 129A is connected by a link 131 to a downwardly extending arm 132 which is pivoted at 133 in the fuselage. An adjusting arm 134 extends upwardly from the shaft 133 so that the shaft 133 may be moved to different adjusted positions to appropriately trim the airplane in accordance with its load distribution. The operating connection from the shaft 133 to the other one of the trim tabs 120 may be extended in part through the link 131 and the associated mechanism to the bell crank 126, or may be extended directly from the shaft 133.

It will be apparent from the foregoing that the flight path and attitude of the airplane with respect to its pitching and rolling axes may be controlled by the pilot through appropriate manipulation of the control wheel 70, such control being exerted by appropriate variation in the angles of incidence of the outboard wing panels 40. Such outboard wing panels are, however, additionally operable to produce flight stability of the airplane automatically and without manual actuation of the control wheel 70. In attaining this result, the rotative axis of each outboard wing panel 40 is disposed parallel to and slightly forwardly of the line defined by the center of pressure of this wing panel. This relationship is illustrated upon a somewhat exaggerated scale in Figs. 22 to 24, and it will be apparent that the lift exerted at the center of pressure of the wing panel 40 due to air flow about the wing panel tends to rotate the wing panel in a counterclockwise or upward direction, as viewed in Fig. 22. This tendency of the lift exerted upon the wing panel is opposed by the eccentrically disposed weight of the wing panel, as represented by the center of gravity CG in Fig. 22. Thus when the plane is flying at a particular altitude and speed, the wing panels 40 will assume positions about their rotative axes which are determined by the relationship of the weight of the wing panels and the lifting forces which are effective thereon. When this balanced condition is attained, the lift of the outboard panels is effective at the mean center of pressure of these panels, and this mean center of pressure of the outboard wing panels 40 is located substantially forward of the center of gravity of the plane, as indicated in Fig. 21 of the drawings. The inboard wing panels 39, of course, exert their lifting action at their mean center of pressure which is located rearwardly of the center of gravity of the airplane, as indicated in Fig. 21.

In attaining the desired controlling action by means of the rocking wing panels 40, the present invention so relates the outer wing panels to the central structure that the center of lift of all portions of the outer wing panels 40 will be located forwardly of, or at least as far forwardly as the most forward location of the center of gravity of the airplane, it being recognized that practical considerations require some range for such location of the center of gravity. Thus, as shown in Fig. 20 of the drawings, the line of separation S between the inner wing panels 39 and the outer wing panels is disposed in such a relation that the centers of lift of the most outward portion of the wing panel 39 and of the most inward portion of the outer wing panel 40 are located in lateral or transverse alignment with the center of gravity CG of the airplane. A convenient method of determining this relationship is to extend a line laterally through the center of gravity CG of the airplane and perpendicular to the longitudinal axis of the airplane, and to terminate the inner wing panel 39 at the point where such a line intersects the quarter chord of the inner wing panel. This relationship is shown in Fig. 20 of the drawings.

When the outboard wing panels 40 are in the balanced condition hereinbefore described, the proportioning of the inboard and outboard wing panels and the relative positions thereof are such as to cause level flight of the airplane, and when the condition of balance of one or both of the outboard wing panels is disturbed due to varying air conditions, air gusts, down drafts or the like these outboard wing panels of the airplane of the present invention function to counteract the disturbing air forces so as to minimize deviation of the airplane from the desired level flight path and minimize deviation of the airplane from the desired course. Thus, as diagrammatically illustrated in Fig. 23 of the drawings, an upward gust of air striking the lower surface of a wing panel 40, or an increase in the angle of attack of the wing panel, tends to lift that wing panel and thus cause deviation of the airplane from the desired flight path, but with the outboard wing panels mounted in the manner hereinbefore described, such an upward gust of air, or other conditions involving an effective increase in the angle of attack of the wing, tend merely to pivot the wing panel 40 about its rocking axis to a corresponding position at which it tends to trim due to the action of the flap 135 as will hereinafter be explained in detail. Thus under such conditions the forces effective on the wing panel serve merely to decrease its angle of incidence and, in many instances, to shift the wing panel to such an extent that it has a negative angle of incidence with relation to the flight path. Such a reduction in the angle of incidence serves, of course, to reduce the angle of attack and hence the lift coefficient of the wing panel, and if the shifting movement of the wing panel about its rotative axis has been comparatively large, it may result in the wing panel having an instantaneous negative lift coefficient. As a result of this shifting of the wing panel 40, the tendency of the upward gust of air to lift that side of the airplane is overcome and the airplane will not deviate appreciably from its desired flight path. As the upward gust of air subsides, the aerodynamic forces acting on the wing panel 40 will restore the same to the balanced condition, such as that shown in Fig. 22 of the drawings.

A similar but opposite action takes place in the event a down draft of air becomes effective upon a wing panel 40, for in such an instance, the force of the downwardly moving air upon the upper surface of the wing panel serves to augment the eccentric weight of the wing panel to rock the wing panel downwardly about its rotative axis and thereby increase the angle of incidence of the wing. Such a down draft or air gust would probably be considered to be an unusual condition, but when encountered, would normally tend to force the wing panel in a downward direction as to cause deviation of the airplane from the desired flight path, but where such down draft or gust acts as aforesaid to produce an increase in the angle of incidence of the wing panel, this tendency of the down draft or gust is overcome by the resultant increase in the lift coefficient of the wing panel. In producing this corrective action, the downward rocking movement of the wing panel is opposed by the aerodynamic lifting forces effective on the wing panel and the wing panel therefore assumes a new trim position as determined by the flap 135. For this reason, the wing panel is sustained against such downward movement or loss of altitude and the airplane does not deviate appreciably from the desired flight path. When the down draft or gust subsides, the balanced condition of the wing panel is restored and the wing panel returns to substantially the relationship shown in Fig. 22 of the drawings.

It will be understood, of course, that the automatic action of the outboard wing panels 40 in response to down drafts or gusts or up drafts or gusts, as hereinbefore described, takes place in the same manner if the disturbing air currents are applied to one or both of the wing panels 40, and such corrective action is effective even in those instances where the disturbing air currents are applied in an opposite sense to the two wing panels 40.

In order that the corrective controlling action of the wing panels 40 may be obtained with a minimum of rocking movement thereof, and in order that the normal or balanced condition of the wing panels 40 may be readily determined and adjusted to conform with flight conditions or variations in factors such as altitude, speed or load, means are provided on the wing panels 40 for increasing the sensitivity of such wing panels to variations in the angle of incidence thereof. As herein shown, such means are afforded by the trailing edge flaps 135 which are provided on each of the wing panels 40. Such trailing edge wing flaps 135 are so arranged that when the wing panels 40 are rocked so as to change or vary the coefficient of lift thereof, the trailing edge wing flaps 135 are actuated in a coordinated relationship to the rocking movement of the wing panels 40 and in such a sense as to vary the coefficient of lift in the same sense as the variation caused by the rocking movement of the wing panel 40.

The coordinated movement of the trailing edge wing flaps may be attained in different ways, and one such means for attaining this result is illustrated in Figs. 12 to 15 of the drawings. Thus as shown in Fig. 14, wherein the trailing edge wing flap 135 is illustrated in its fairing condition, it will be clear that an actuating rod 137 is connected to the wing flap 135 by an operating arm 138 so that pivotal connection therewith is disposed beneath the rotative axis 139 of the flap 135. The actuating rod extends in a forwardly and upwardly direction and is connected at its forward end to a stationary arm 140 which may be mounted upon the supporting truss 45. As herein shown, the actuating rod 137 includes a turn buckle adjusting means 141 which, as shown in Fig. 12, comprises a gear 142 threaded with threads of opposite lead to the adjacent ends of the sections of the adjusting rod 137. Thus the length of the rod 137 may be adjusted and the angle of incidence of the wing panel at which the flap 135 assumes its fairing relationship may be thus determined and adjusted. With this construction, it will be evident that when the wing flap 40 is pivoted in an upward direction to the relationship shown in Fig. 13, the trailing edge wing flap 135 will be pivoted in an upward direction and in an amount proportional to the upward rocking movement of the wing panel 40. Where the angle of attack of the wing panel is thus reduced, the consequent raising of the flap 135 reduces the lift of the panel in a manner similar to the effect of a raised aileron, and hence the wing panel rocks downwardly under the action of the changed aerodynamic forces to assume a new trim position determined by the setting of the mechanism governing the position of the flap 135. Similarly, when the wing panel 40 is rocked downwardly, the trailing edge flap 135 thereof will be rocked downwardly, as shown in Fig. 15, in an amount proportional to the rocking movement of the wing panel 40. This lowering of the flap 135 acts in substantially the same manner as the lowering of an aileron to increase the lift of the wing panel, and this results in upward rocking of the wing panel to a new position of trim. Thus the corrective or restoring action of the wing panel 40 will in every instance be augmented by the related shifting or rocking movement of the trailing edge wing flap 135 thereof.

In Fig. 16 of the drawings, another mechanism for coordinating the rocking movement of the wing flap 135 with the wing panel 40 is illustrated, and in this structure, the actuating means for the wing flap 135 is interconnected with the actuating means for the wing panel 40. Thus an arm 145 extended downwardly from the wing flap 135, has an actuating rod 146 extended forwardly therefrom and connected to the upper end of a rocking lever 147. The upper end 147A of the rocking lever 147 is connected by a cable 148A to the lower end 149A of a rocking lever 149, this rocking lever 149 being disposed on the wing panel 40 adjacent the inner end thereof. In a similar manner, the lower end 147B of the rocking lever 147 is connected by a cable 148B to the upper end 149B of the rocking lever 149. In attaining such interconnection of the rocking levers 147 and 149, the cables 148A and 148B extend in a forward direction from the rocking lever 147 and about a pulley structure 150. The cables 148A and 148B then extend in a slightly rearward and inward direction so as to pass respectively about pulleys 151 and 152. The cables then extend in an inward direction so as to pass about a pulley structure 152A and then rearwardly to their points of connection with the arms of the rocking lever 149. The rocking lever 149 is arranged to be actuated from and in a proportional relationship to the actuation of the rocking shaft 91R, and in the present instance, this connection is such as to enable adjustment of the force transmitting connection therebetween. Thus as shown in Fig. 16 of the drawings, an actuating rod 155 is connected to the upper arm 149B of the rocking lever 149 and extends rearwardly therefrom and is connected to one arm of a horizontally pivoted lever 156. The lever 156 is centrally pivoted at 157 and its other end is connected to the upper end of the lever 90R by an adjustable link 160. The adjustable link 160 may be of substantially the same construction as the adjustable link 137 so that the turn buckle mechanism 141A thereof may be rotated to adjust the length of the link 160. In the present instance, such adjustment may be attained from a shaft 161 extended from the pilot's compartment and having a gear 162 thereon connected by a chain 163 to the adjusting gear 141A of the link 160. A similar adjusting mechanism 161B may be provided for the other one of the operating connections which operates the wing flap 135 of the other wing panel 40, and such adjusting connections 161 and 161B are preferably arranged for independent actuation, although actuation of these connections in unison may in many instances be employed.

The adjustment of the connecting links 160 to the trailing edge wing flaps 135 serves to determine the angle of incidence of the outer wing panels 40 at which the flaps 135 will be disposed in a fairing relation to their panels, and hence this adjustment of the flaps 135 determines the normal angle of incidence of the outer wing panels in level flight. Such adjustment of the flaps 135 is, of course, made in accordance with the altitude and air speed of the flight that is desired or is to be maintained, and after such adjustment, the outer wing panels and the flaps 135 will operate automatically to maintain the airplane in level flight in accordance with such setting or adjustment. Variations in applied power or in wind direction may, of course, vary the air speed of the airplane, so as to thereby vary the controlling action of the variable incidence wing flaps, but even under such conditions the automatic controlling action is such that the airplane seeks a level flight condition determined by the new air speed. Thus, the controlling action of the wing panels 40 and their trailing edge wing flaps 135 is such as to prevent undesired deviations of the airplane from the desired level flight course.

From the foregoing it will be evident that the airplane of the present invention eliminates the usual elevators and ailerons, and attains control of the airplane about its pitching and rolling axes through the use of exceedingly large and effective control surfaces. Moreover, the rudder of the present airplane is operable to automatically assume the proper coordinated position in banking or rolling movements of the airplane and hence objectionable slipping or skidding are prevented.

The airplane of the present invention is such that the aerodynamic means that are actuated manually to attain control of the airplane about its pitching and rolling axes may also function automatically to overcome the usual effects of disturbing wind currents and gusts. Such aerodynamic means as afforded by the present invention are so arranged as to enable the setting thereof in accordance with the altitude, speed and other variable factors, and such aerodynamic means, while operable automatically to maintain the desired flight path, are available for manual operation by the pilot at any time when he wishes to vary such flight path. The trailing edge wing flaps on the rockable or variable incidence outer wing panels serve through their adjustable mounting to determine the normal level flight position or normal level flight angle of incidence of the outer wing panels; and by reason of their operative interconnection with the outer wing panels so as to move in the same direction or sense as such outer wing panels, these trailing edge wing flaps serve to increase and facilitate the desired controlling action of the outer wing panels.

Thus, while I have illustrated and described a preferred embodiment of my invention, it is to be understood that these are capable of variation and modification and I therefore do not wish to be limited to the precise details set forth, but desire to avail myself of such changes and alterations as fall within the purview of the following claims.

I claim:

1. In an airplane, a central structure comprising a fuselage and inner wing panels extended rigidly and with a forward sweep from opposite sides of said fuselage, directional control means, a pair of outboard wing panels disposed as substantial outward continuations of the respective inboard wing panels and supported thereon for limited rocking movement about generally horizontal axes to enable individual variation of the angle of incidence of such outboard wing panels, said inboard wing panels having the mean center of lift thereof disposed rearwardly of the center of gravity of the airplane and said outboard wing panels having their mean center of lift located forwardly of the center of gravity of said airplane, the front to rear lines of separation of the inner and outer wing panels being so disposed as to extend substantially through the points where the quarter chords of the inner wing panels are intersected by a transverse line extended from the most forward position of the center of gravity of the airplane perpendicular to the longitudinal axis of the airplane, control means for operating said direction control means, and means for causing and controlling rocking movement at said outboard wing panels with relation to said central structure.

2. In an airplane, a central structure comprising a fuselage and inner wing panels extended rigidly and with a forward sweep from opposite sides of said fuselage, directional control means mounted on said central structure, a pair of outboard wing panels disposed as substantial outward continuations of the respective inboard wing panels and supported thereon for limited rocking movement about generally horizontal axes to enable individual variation of the angle of incidence of such outboard wing panels, said inboard wing panels having the mean center of lift thereof disposed rearwardly of the center of gravity of the airplane and said outboard wing panels having their mean center of lift located forwardly of the center of gravity of said airplane, said rocking axes of said outboard wing panels being located forwardly of the line defining the centers of pressure of the respective outboard wing panels whereby the positive lifting forces effective on such outboard panels tend to rock said panels about their rocking axes, trailing edge wing flaps on said outboard panels, means operable to actuate the respective trailing edge flaps with respect to their wing panels in proportion to and in the same sense as the rocking movements of the outboard wing panels upon which they are respectively mounted to produce aerodynamic forces to oppose and control said rocking movements of the panels induced by said positive lifting forces, control means for operating said direction control means, and control means for rocking said outboard wing panels relative to said central structure, singly, in unison, or differentially.

3. In an airplane, a central structure comprising a fuselage and inner wing panels extended rigidly and with a forward sweep from opposite sides of said fuselage, directional control means mounted on said central structure, a pair of outboard wing panels disposed as substantial outward continuations of the respective inboard wing panels and supported thereon for limited rocking movement about generally horizontal axes to enable individual variation of the angle of incidence of such outboard wing panels, said inboard wing panels having the mean center of lift thereof disposed rearwardly of the center of gravity of the airplane and said outboard wing panels having their mean center of lift located forwardly of the center of gravity of said airplane, said rocking axes of said outboard wing panels being located forwardly of the line defining the centers of pressure of the respective outboard wing panels whereby the positive lifting forces effective on such outboard panels tend to rock said panels about their rocking axes, trailing edge wing flaps on said outboard panels, and flap control means operable to actuate the respective trailing edge flaps with respect to their wing panels in proportion to and in the same sense as the rocking movements of the outboard wing panels upon which they are respectively mounted to produce aerodynamic forces to oppose and control said rocking movements of the panels induced by said positive lifting forces.

4. In an airplane, a central structure comprising a fuselage and inner wing panels extended rigidly and with a forward sweep from opposite sides of said fuselage, directional control means mounted on said central structure, a pair of outboard wing panels disposed as substantial outward continuations of the respective inboard wing panels and supported thereon for limited rocking movement about generally horizontal axes to enable individual variation of the angle of incidence of such outboard wing panels, said inboard wing panels having the mean center of lift thereof disposed rearwardly of the center of gravity of the airplane and said outboard wing panels having their means center of lift located forwardly of the center of gravity of said airplane, said rocking axes of said outboard wing panels being located forwardly of the line defining the centers of pressure of the respective outboard wing panels whereby the positive lifting forces effective on such outboard panels tend to rock said panels about their rocking axes, trailing edge wing flaps on said outboard panels, flap control means operable to actuate the respective trailing edge flaps with respect to their wing panels in proportion to and in the same sense as the rocking movements of the outboard wing panels upon which they are respectively mounted to produce aerodynamic forces to oppose and control said rocking movements of the panels induced by said positive lifting forces, and means for adjusting said flap control means to vary the angle of incidence of said outer wing panels at which said flaps assume a fairing relation to said outer wing panels.

5. In an airplane, a central structure comprising a fuselage and inner wing panels extended rigidly and with a forward sweep from opposite sides of said fuselage, directional control means mounted on said central structure, a pair of outboard wing panels disposed as substantial outward continuations of the respective inboard wing panels and supported thereon for limited rocking movement about generally horizontal axes to enable individual variation of the angle of incidence of such outboard wing panels, said inboard wing panels having the mean center of lift thereof disposed rearwardly of the center of gravity of the airplane and said outboard wing panels having their mean center of lift located forwardly of the center of gravity of said airplane, said rocking axes of said outboard wing panels being located forwardly of the line defining the centers of pressure of the respective outboard wing panels whereby the positive lifting forces effective on such outboard panels tend to rock said panels about their rocking axes, trailing edge wing flaps on said outboard panels, the front to rear lines of separation of the inner and outer wing panels being so disposed as to extend substantially through the points where the quarter chords of the inner wing panels are intersected by a transverse line extended from the most forward location of the center of gravity of the airplane perpendicular to the longitudinal axis of the airplane, means operable to actuate the respective trailing edge flaps with respect to their wing panels in proportion to and in the same sense as the rocking movements of the outboard wing panels upon which they are respectively mounted to produce aerodynamic forces to oppose and control said rocking movements of the panels induced by said positive lifting forces, control means for operating said direction control means, and control means for rocking said outboard wing panels relative to said central structure, singly, in unison, or differentially.

6. In an airplane, a central structure comprising a fuselage and inner wing panels extended rigidly and with a forward sweep from opposite sides of said fuselage, directional control means mounted on said central structure, a pair of outboard wing panels disposed as substantial outward continuations of the respective inboard wing panels and supported thereon for limited rocking movement about generally horizontal axes to enable individual variation of the angle of incidence of such outboard wing panels, said inboard wing panels having the mean center of lift thereof disposed rearwardly of the center of gravity of the airplane and said outboard wing panels having their mean center of lift located forwardly of the center of gravity of said airplane, said rocking axes of said outboard wing panels being located forwardly of the line defining the centers of pressure of the respective outboard wing panels whereby the positive lifting forces effective on such outboard panels tend to rock said panels about their rocking axes, trailing edge wing flaps on said outboard panels, the front to rear lines of separation of the inner and outer wing panels being so disposed as to extend substantially through the points where the quarter chords of the inner wing panels are intersected by a transverse line extended from the most forward location of the center of gravity of the airplane perpendicular to the longitudinal axis of the airplane, and flap control means operable to actuate the respective trailing edge flaps with respect to their wing panels in proportion to and in the same sense as the rocking movements of the outboard wing panels upon which they are respectively mounted to produce aerodynamic forces to oppose and control said rocking movements of the panels induced by said positive lifting forces.

7. In an airplane, a central structure comprising a fuselage and inner wing panels extended rigidly and with a forward sweep from opposite sides of said fuselage, directional control means mounted on said central structure, a pair of outboard wing panels disposed as substantial outward continuations of the respective inboard wing panels and supported thereon for limited rocking movement about generally horizontal axes to enable individual variation of the angle of incidence of such outboard wing panels, said inboard wing panels having the mean center of lift thereof disposed rearwardly of the center of gravity of the airplane and said outboard wing panels having their mean center of lift located forwardly of the center of gravity of said airplane, said rocking axes of said outboard wing panels being located forwardly of the line defining the centers of pressure of the respective outboard wing panels whereby the positive lifting forces effective on such outboard panels tend to rock said panels about their rocking axes, trailing edge wing flaps on said outboard panels, the front to rear lines of separation of the inner and outer wing panels being so disposed as to extend substantially through the points where the quarter chords of the inner wing panels are intersected by a transverse line extended from the most forward location of the center of gravity of the airplane perpendicular to the longitudinal axis of the airplane, flap control means operable to actuate the respective trailing edge flaps with respect to their wing panels in proportion to and in the same sense as the rocking movements of the outboard wing panels upon which they are respectively mounted to produce aerodynamic forces to oppose and control said rocking movements of the panels induced by said positive lifting forces, and means for adjusting said flap control means to vary the angle of incidence of said outer wing panels at which said flaps assume a fairing relation to said outer wing panels.

8. In an airplane, a central structure comprising a fuselage and inner wing panels extended rigidly and with a forward sweep from opposite sides of said fuselage, directional control means mounted on said central structure, a pair of outboard wing panels disposed as substantial outward continuations of the respective inboard wing panels and supported thereon for limited rocking movement about generally horizontal axes to enable individual variation of the angle of incidence of such outboard wing panels, said inboard wing panels having the mean center of lift thereof disposed rearwardly of the center of gravity of the airplane and said outboard wing panels having their mean center of lift located forwardly of the center of gravity of said airplane, said rocking axes of said outboard wing panels being located forwardly of the line defining the centers of pressure of the respective outboard wing panels whereby the lifting forces effective on such outboard panels tend to rock said panels about their rocking axes, trailing edge wing flaps on said outboard panels, means operable to actuate the respective trailing edge flaps in proportion to and in the same sense as the rocking movements of the outboard wing panels upon which they are respectively mounted to produce aerodynamic forces to oppose and control said rocking movements of the panels induced by said positive lifting forces, control means for operating said direction control means, and actuating means mounted on said inboard panels and connected to said outboard wing panels and operable to rock said outboard wing panels about said axes relative to said central structure.

9. In an airplane, a central structure comprising a fuselage and inner wing panels extended rigidly and with a forward sweep from opposite sides of said fuselage, directional control means mounted on said central structure, a pair of outboard wing panels disposed as substantial outward continuations of the respective inboard wing panels and supported thereon for limited rocking movement about generally horizontal axes to enable individual variation of the angle of incidence of such outboard wing panels, said inboard wing panels having the mean center of lift thereof disposed rearwardly of the center of gravity of the airplane and said outboard wing panels having their mean center of lift located forwardly of the center of gravity of said airplane, said rocking axes of said outboard wing panels being located forwardly of the line defining the centers of pressure of the respective outboard wing panels whereby the lifting forces effective on such outboard panels tend to rock said panels about their rocking axes, the front to rear lines of separation of the inner and outer wing panels being so disposed as to extend substantially through the points where the quarter chords of the inner wing panels are intersected by a transverse line extended from the most forward location of the center of gravity of the airplane perpendicular to the longitudinal axis of the airplane, trailing edge wing flaps on said outboard panels, means operable to actuate the respective trailing edge flaps in proportion to and in the same sense as the rocking movements of the outboard wing panels upon which they are respectively mounted to produce aerodynamic forces to oppose and control said rocking movements of the panels induced by said positive lifting forces, control means for operating said direction control means, and actuating means mounted on said inboard panels and connected to said outboard wing panels and operable to rock said outboard wing panels about said axes relative to said central structure.

10. In an airplane, a central structure comprising a fuselage and inner wing panels extended rigidly and with a forward sweep from opposite sides of said fuselage, directional control means mounted on a rear portion of said central structure for controlling flight with respect to the yawing axis, a pair of outboard wing panels disposed as substantial outward continuations of the respective inboard wing panels and supported thereon for limited rocking movement about generally horizontal axes to enable individual variation of the angle of incidence of such outboard wing panels, said inboard wing panels having the mean center of lift thereof disposed rearwardly of the center of gravity of the airplane and said outboard wing panels having their mean center of lift located forwardly of the center of gravity of said airplane, said rocking axes of said outboard wing panels being located forwardly of the line defining the centers of pressure of the respective outboard wing panels whereby the positive lifting forces effective on such outboard panels tend to rock said panels about their rocking axes, trailing edge wing flaps on said outboard panels, flap control means operable to actuate the respective trailing edge flaps with respect to their wing panels in proportion to and in the same sense as the rocking movements of the outboard wing panels upon which they are respectively mounted to produce aerodynamic forces to oppose and control said rocking movements of the panels induced by said positive lifting forces, control means for rocking said outboard wing panels relative to said central structure, singly, in unison or differentially, governing means actuated by said control means when said wing panels are rocked differentially for operating said direction control means in a coordinated relationship to the differential movements of said wing panels to prevent slipping or skidding of the airplane.

GEORGE W. CORNELIUS.